(12) United States Patent
Oshima et al.

(10) Patent No.: US 10,690,696 B2
(45) Date of Patent: Jun. 23, 2020

(54) ACCELERATION SENSOR

(71) Applicant: Hitachi, Ltd., Tokyo (JP)

(72) Inventors: Takashi Oshima, Tokyo (JP); Masaru Kokubo, Tokyo (JP); Yuki Furubayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 148 days.

(21) Appl. No.: 16/142,255

(22) Filed: Sep. 26, 2018

(65) Prior Publication Data

US 2019/0212358 A1 Jul. 11, 2019

(30) Foreign Application Priority Data

Jan. 9, 2018 (JP) .................. 2018-001069

(51) Int. Cl.
*G01P 15/125* (2006.01)
*G01P 15/13* (2006.01)
*G01P 15/08* (2006.01)

(52) U.S. Cl.
CPC ........ *G01P 15/125* (2013.01); *G01P 15/0802* (2013.01); *G01P 15/131* (2013.01)

(58) Field of Classification Search
CPC .. G01P 15/125; G01P 15/131; G01P 15/0802; G01L 1/2256; G01L 19/086; G01R 33/0286; B81B 3/0032
See application file for complete search history.

(56) References Cited

U.S. PATENT DOCUMENTS

| | | | |
|---|---|---|---|
| 6,691,572 B1 * | 2/2004 | Handrich | G01P 15/125 73/514.18 |
| 2002/0148291 A1 * | 10/2002 | Nagahara | G01P 15/125 73/514.32 |
| 2006/0213270 A1 * | 9/2006 | O'Dowd | H03M 3/34 73/514.32 |
| 2011/0154906 A1 * | 6/2011 | Grosjean | G01D 5/24 73/771 |
| 2016/0091525 A1 | 3/2016 | Oshima et al. | |
| 2018/0011125 A1 * | 1/2018 | Oshima | G01P 15/125 |

FOREIGN PATENT DOCUMENTS

JP 2016-070815 A 5/2016

OTHER PUBLICATIONS

Marc Pastre et al., "A 300Hz 19b DR Capacitive Accelerometer based on a Versatile Front End in a 5th-order ΔΣ Loop", 2009 IEEE European Solid-State Circuits Conference, Sep. 2009, pp. 288-291.

* cited by examiner

*Primary Examiner* — Brandi N Hopkins
(74) *Attorney, Agent, or Firm* — Mattingly & Malur, PC

(57) ABSTRACT

A servo control signal is binarized using a digital delta-sigma modulator. The digital delta-sigma modulator forms a feedback loop including a digital adder/subtractor, a digital integrator, and a one-bit quantizer to perform pulse-density modulation of the input servo control signal and output the signal as a binary value of +1 or −1.

9 Claims, 12 Drawing Sheets

FIRST EMBODIMENT

CONVENTIONAL EXAMPLE

ACCELERATION SENSOR

CLAIM OF PRIORITY

The present application claims priority from Japanese application serial no. JP2018-001069, filed on Jan. 9, 2018, the content of which is hereby incorporated by reference into this application.

BACKGROUND OF THE INVENTION

1. Field of the Invention

The present invention relates to an acceleration sensor, and more particularly to a micro electro mechanical systems (MEMS) capacitive low noise and low power consumption acceleration sensor.

2. Description of the Related Art

In a seismic reflection survey for exploration of a new oil filed or gas field for oil or a natural gas and monitoring of reserves, multiple acceleration sensors are scattered and disposed so as to form a predetermined two-dimensional arrangement on a ground surface of a stratum in which resources are predicted to be buried, and then, an artificial earthquake is generated to grasp reflected waves of seismic waves thereof reflected on the stratum as acceleration. Such a survey is used for an application of analyzing acceleration data received simultaneously by the two-dimensionally arranged sensor group to investigate a state of the stratum and determine presence or absence of resources such as oil and a natural gas. The acceleration sensor for the seismic reflection survey needs to cause noise which is less by several orders of magnitude than noise of an acceleration sensor in other fields in order to detect a weak acceleration signal. In addition, since the multiple sensors are used, each of the sensors needs to be low cost, and thus, there are demands for reduction of battery cost through low power consumption and realization of sensors using a MEMS which is easily mass-produced.

A MEMS capacitive acceleration sensor is disclosed in M. Pastre, M. Kayal, H. Schmid, A. Huber, P. Zwahlen, A. Nguyen and Y. Dong, "A 300 Hz 19b DR Capacitive Accelerometer based on a Versatile Front End in a 5th-order $\Delta\Sigma$Loop," 2009 IEEE European Solid-State Circuits Conference, pp. 288-291, September 2009. In order to stably realize low noise, servo control is used. A MEMS capacitive element is shared for detection of an acceleration signal and application of a servo force, and the acceleration signal detection and the servo control are alternately performed by time division processing. However, each operation period of the acceleration signal detection and the servo control is halved in the time division processing, and thus, it is necessary to operate an internal circuit two times faster or to generate a higher voltage for the servo force application so that power consumption increases.

In the method disclosed in JP 2016-070815 A, acceleration signal detection and servo control are performed in parallel at the same time by independently providing MEMS for acceleration signal detection and MEMS for servo force application, and thus, power consumption can be reduced. However, the MEMS structure becomes more complicated than that in the case of time division processing.

In the methods of JP 2016-070815 A and M. Pastre, M. Kayal, H. Schmid, A. Huber, P. Zwahlen, A. Nguyen and Y. Dong, "A 300 Hz 19b DR Capacitive Accelerometer based on a Versatile Front End in a 5th-order $\Delta\Sigma$Loop," 2009 IEEE European Solid-State Circuits Conference, pp. 288-291, September 2009, proportional-integral-differential (PID) control is performed in a digital domain after digitizing a detection signal with an analog/digital (A/D) converter, and thus, highly-accurate and extremely-fine PID control can be implemented. As a result, it is possible to reduce the noise. In addition, a servo control signal calculated by the PID control is binarized to +1 or −1 depending on its positive or negative and applied to the MEMS.

SUMMARY OF THE INVENTION

Based on results of studies conducted by the inventor, it has been found that the methods of JP 2016-070815 A and M. Pastre, M. Kayal, H. Schmid, A. Huber, P. Zwahlen, A. Nguyen and Y. Dong, "A 300 Hz 19b DR Capacitive Accelerometer based on a Versatile Front End in a 5th-order $\Delta\Sigma$Loop," 2009 IEEE European Solid-State Circuits Conference, pp. 288-291, September 2009. have the following problems in terms of realizing further reduction in noise.

That is, components in a frequency domain, in the vicinity of a high-order resonance frequency of a MEMS, of an error generated during the binarization of the servo control signal are converted into low-frequency noise, thereby increasing a noise level within a signal band.

Therefore, an object of the invention is to adopt a delta-sigma modulation function for lowering a spectral density of a quantization error component in the vicinity of the high-order resonance frequency of the MEMS in the binarization processing of the servo control signal.

A preferable example of a MEMS capacitive acceleration sensor of the invention includes: a capacitive MEMS; a C/V amplifier; an analog/digital converter; a digital PID control unit; and a binarizer. The C/V amplifier converts a charge signal output from the capacitive MEMS into an electric signal. The analog/digital converter converts an analog signal based on the electric signal into a digital signal. The digital PID control unit calculates a control signal based on the digital signal. The binarizer converts the control signal into a binary signal. A negative feedback servo control loop in which the capacitive MEMS is controlled by the binary signal is formed. The digital PID control unit performs integration at least once to calculate the control signal. The binarizer forms a feedback loop including an integrator, a subtractor, and an encoder. The encoder generates a binary output depending on whether an input signal is a positive value or a negative value.

In addition, another feature of the invention, the binarizer is configured to include two integrators in series in the MEMS capacitive acceleration sensor.

As still another feature of the invention, the binarizer is configured to include two integrators arranged in series and a local loop in which an output signal of the integrator at a latter stage is fed back to the front of the integrator at a preceding stage in the MEMS capacitive acceleration sensor.

Since components in a frequency domain, in the vicinity of a high-order resonance frequency of a MEMS, of an error generated during the binarization of the servo control signal are reduced, the amount of conversion to low-frequency noise is reduced, and it is possible to suppress an increase of a noise level within a signal band.

DESCRIPTION OF THE PREFERRED EMBODIMENTS

Figure 1A:
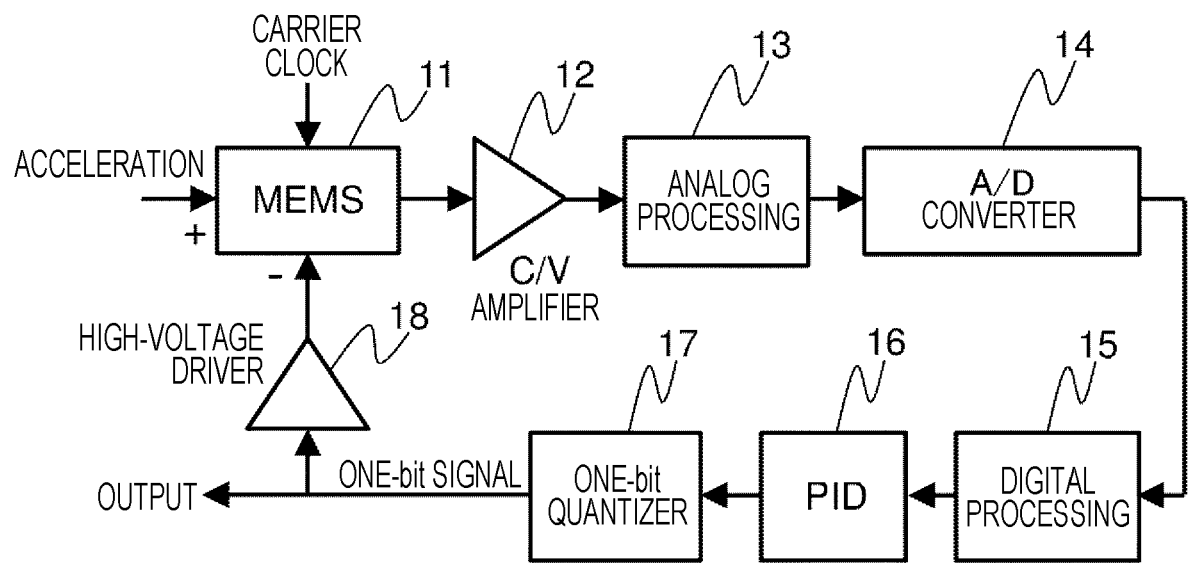
FIG. 1A is a configuration diagram of a MEMS acceleration sensor of the related art.

Prior to describing the invention, problems of MEMS acceleration sensors disclosed in JP 2016-070815 A and M. Pastre, M. Kayal, H. Schmid, A. Huber, P. Zwahlen, A. Nguyen and Y. Dong, "A 300 Hz 19b DR Capacitive Accelerometer based on a Versatile Front End in a 5th-order ΔΣLoop," 2009 IEEE European Solid-State Circuits Conference, pp. 288-291, September 2009. will be described with reference to FIGS. 1A and 1B.

In the MEMS acceleration sensor, a MEMS as a mechanical part, and a capacitive MEMS 11 having a mechanical part configured using MEMS and one weight (movable electrode portion) configured to detect a vibration acceleration extremely smaller than gravity, a C/V amplifier 12, an analog signal processing unit 13, an analog/digital (A/D) converter 14, a digital signal processing unit 15, a PID control unit 16, and a one-bit quantizer 17 are connected in this order. An output of the one-bit quantizer 17 becomes an output as the acceleration sensor, and thereafter, a digital filter is appropriately inserted so that a component outside a signal band is suppressed. In addition, the output of the one-bit quantizer 17 is connected to a high-voltage driver 18, and an output of the high-voltage driver 18 is applied to the MEMS 11, thereby forming a negative feedback servo control loop.

As the MEMS 11 receives a differential force between an inertial force caused by an externally-applied acceleration signal and a servo force caused by an electrostatic force generated by an output voltage of the high-voltage driver 18, the movable electrode (not illustrated) moves, and accordingly, a capacitance value changes. A carrier clock voltage is also applied to the MEMS 11, and accordingly, the change of the capacitance value is converted into a change of a charge and amplitude-modulated. The amplitude-modulated charge change is converted into a change of a voltage by the C/V amplifier 12 connected to the MEMS 11. The analog signal processing unit 13 includes an amplifier and an analog filter, amplifies the voltage change using the amplifier, and removes unnecessary components and noise using the analog filter. The A/D converter 14 converts the analog signal of the amplified voltage change into a digital value. The digital signal processing unit 15 performs demodulation to convert an output of the A/D converter 14 to a value proportional to displacement of the movable electrode, removal of unnecessary signal components, and the like.

Further, the PID control unit 16 performs PID control including calculation of integration and subtraction to calculate a servo control signal. The one-bit quantizer 17 is a sign discriminator, and outputs +1 if the servo control signal is positive (non-negative) and outputs −1 if the servo control signal is negative. As a result, the servo control signal is binarized. The high-voltage driver 18 converts a signal of +1 or −1 into a high-voltage signal of +VSV or −VSV (VSV is a high voltage of about 10 V to 20 V), and the negative feedback servo control loop is formed as the high-voltage signal is applied to the MEMS 11.

When it is attempted to perform servo control by the servo control signal output of the PID control unit 16 without performing binarization using the one-bit quantizer 17 (without adopting the one-bit quantizer 17), there arises a need to replace the high-voltage driver 18 with an N-bit D/A (digital-to-analog) converter of a high-voltage output if a digital word length representing the output of the PID control unit 16 is N bits. Due to such a high-voltage multibit D/A converter, noise, power consumption, and nonlinearity increase. Thus, binarization (quantization into one bit) of the servo control signal conventionally causes a quantization error to a large extent, but the one-bit quantizer 17 is intentionally adopted to serve an important role.

With the negative feedback servo control loop, the inertial force caused by the input acceleration signal and the servo force are controlled to be balanced in a steady state. Thus, the output of the one-bit quantizer 17, which is a source that generates the servo force, can be used as a sensor output.

Figure 1B:
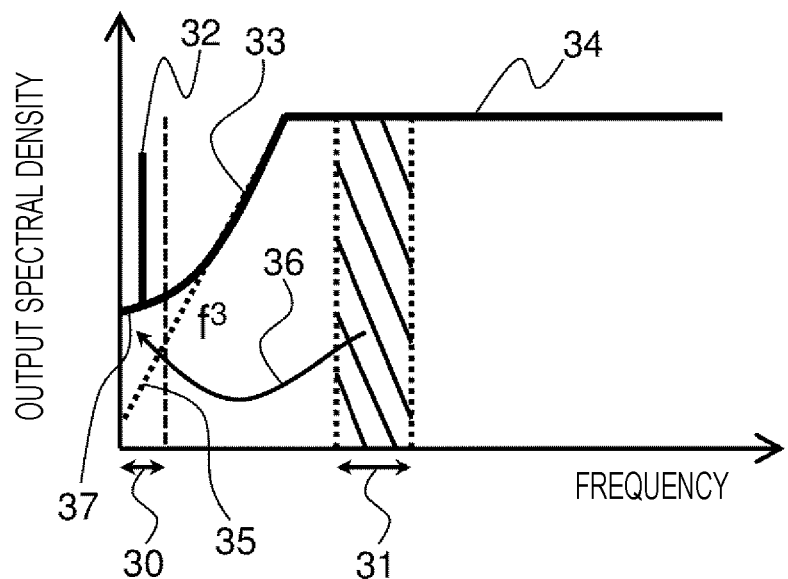
FIG. 1B is a graph illustrating a frequency spectrum of an output of a one-bit quantizer.

FIG. 1B illustrates a frequency spectrum of the sensor output, that is, the output of the one-bit quantizer 17. A tone 32 set within a signal band 30 (for example, a band within 100 Hz is set as the signal band in this embodiment) is an example of a spectrum corresponding to an acceleration signal input with a single frequency. In addition, a profile 33 in a solid line other than the tone 32 indicates a noise floor due to the quantization error. Since the one-bit quantizer 17 performs binarization as described above, the output thereof is different from the output of the PID control unit 16 which is an original servo control signal. Such a difference is the quantization error. As indicated by a lateral solid line 34 of the frequency spectrum graph, there are many quantization error components in a high-frequency domain. On the other hand, when the PID control unit 16 performs third-order PID control, for example, quantization error components in a low-frequency domain are suppressed to a cube ($f^3$) of the frequency as indicated by an oblique dotted line 35 in the graph, and thus, decrease, of course, sufficiently within the low frequency signal band.

Through studies of the inventor, however, it has been found that the noise in the signal band 30 increases with a following mechanism. That is, components of a frequency domain 31, in the vicinity of the high-order resonance frequency of the MEMS, of the quantization error of the high-frequency domain having a high spectral density, are converted into low frequency noise (36) as illustrated in FIG. 1B, thereby increasing a noise level 37 within the signal band 30. In the MEMS, there are multiple high-order resonance modes caused by the finite stiffness of the MEMS and finite strength of a mechanical joint in addition to the basic resonance mode required for the operation as the acceleration sensor. In particular, the frequency domain where many high-order resonance modes having large amplitudes exist is illustrated as the "high-order resonance mode region" 31.

Among the quantization error components of the high-order resonance mode region 31, a quantization error component existing in a frequency domain in the vicinity of a resonance frequency of each high-order resonance mode excites a high-order resonance mode of the MEMS, and further, the excitation is converted into a low frequency oscillation within the signal band (36) due to the nonlinearity caused by asymmetry of the MEMS structure. As a result, the mechanism by which the low-frequency noise increases has been found.

Based on the above description, embodiments of the invention will be described hereinafter.

First Embodiment

Figure 2:
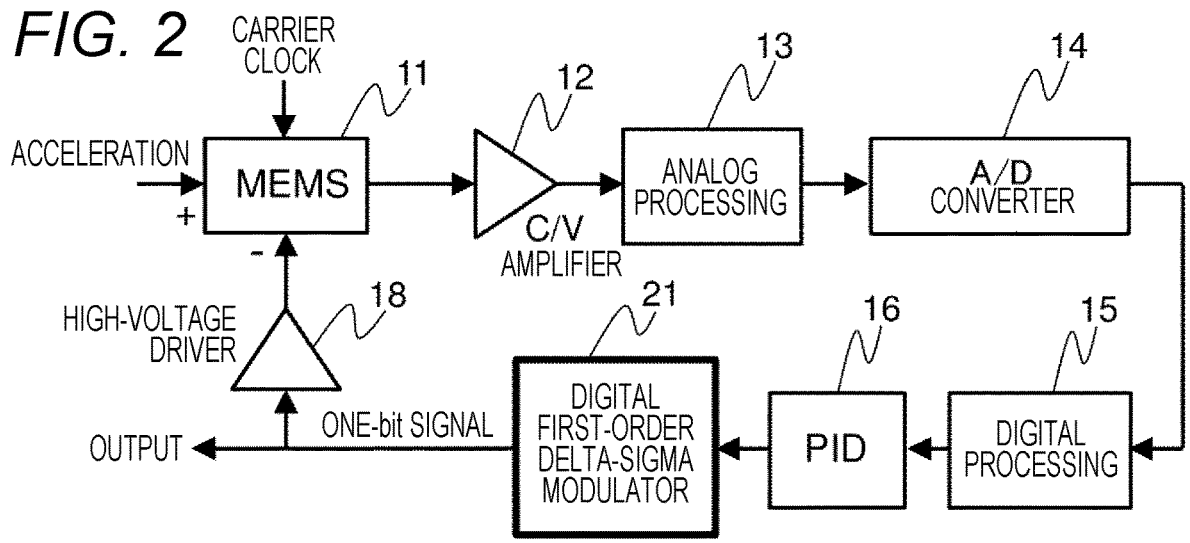
FIG. 2 is a configuration diagram of a MEMS acceleration sensor according to a first embodiment.

A first embodiment will be described with reference to FIG. 2. In the first embodiment, a digital first-order delta-sigma modulator (binarizer) 21 is used instead of the one-bit quantizer in the configuration of FIGS. 1A and 1B described above.

In a MEMS acceleration sensor, the capacitive MEMS 11, the C/V amplifier 12, the analog signal processing unit 13, the analog/digital (A/D) converter 14, the digital signal processing unit 15, the PID control unit 16, and the digital first-order delta-sigma modulator 21 are connected in this order. An output of the digital first-order delta-sigma modulator 21 becomes an output as the acceleration sensor, and thereafter, a digital filter is appropriately inserted so that a component outside a signal band is suppressed. In addition, the output of the digital first-order delta-sigma modulator 21 is connected to a high-voltage driver 18, and an output of the high-voltage driver 18 is applied to the MEMS 11, thereby forming a negative feedback servo control loop.

As the MEMS 11 receives a differential force between an inertial force caused by an externally-applied acceleration signal and a servo force caused by an electrostatic force generated by an output voltage of the high-voltage driver 18, the movable electrode moves, and accordingly, a capacitance value changes. A carrier clock voltage is also applied to the MEMS 11, and accordingly, the change of the capacitance value is converted into a change of a charge and amplitude-modulated. The amplitude-modulated charge change is converted into a change of a voltage by the C/V amplifier 12 connected to the MEMS 11. The analog signal processing unit 13 includes an amplifier and an analog filter, amplifies the voltage change using the amplifier, and removes unnecessary components and noise using the analog filter. The A/D converter 14 converts the analog signal of the amplified voltage change into a digital value. The digital signal processing unit 15 performs demodulation, removal of unnecessary components, and the like.

Further, the PID control unit 16 performs PID control including calculation of integration and subtraction to calculate a servo control signal. The digital first-order delta-sigma modulator (binarizer) 21 modulates a pulse density of the servo control signal to be output as a binary value of +1 or −1. The high-voltage driver 18 converts a signal of +1 or −1 into a high-voltage signal of +VSV or −VSV (VSV is a high voltage of about 10 V to 20 V), and the negative feedback servo control loop is formed as the high-voltage signal is applied to the MEMS 11. The binarization of the digital first-order delta-sigma modulator (binarizer) 21 makes a high voltage multibit D/A converter unnecessary, and accordingly, it is possible to avoid noise, power consumption, and nonlinearity. This point is the same as in the case of FIGS. 1A and 1B.

With the negative feedback servo control loop, the inertial force caused by the input acceleration signal and the servo force are controlled to be balanced in a steady state. Thus, the output of the digital first-order delta-sigma modulator 21, which is a source that generates the servo force, can be used as a sensor output.

Figure 3A:
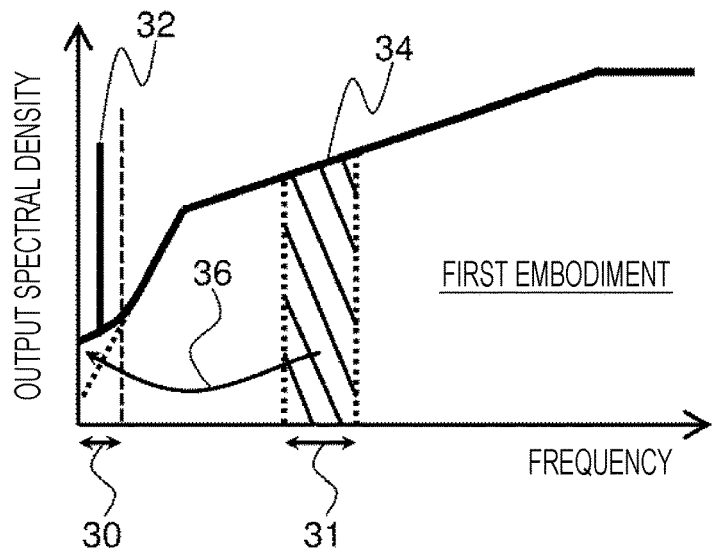
FIG. 3A is a graph for describing an effect of the first embodiment as compared with a conventional example in FIG. 3B.
Figure 3B:
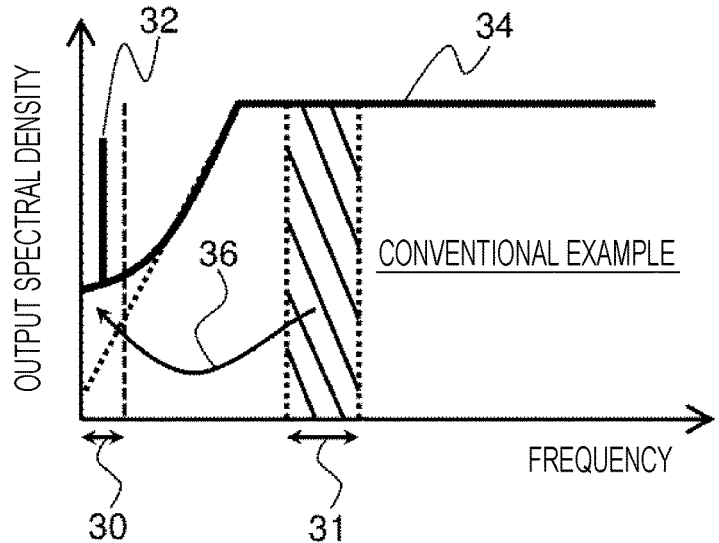

Effects of this embodiment will be described with reference to FIG. 3A. As described in FIGS. 1A and 1B, in the method of binarizing the servo control signal based on the positive/negative sign discrimination, the quantization error component having the high spectral density existing in the high-order resonance mode region 31 of the MEMS is converted (36) into the low-frequency noise in the signal band 30 as illustrated in FIG. 3B (conventional). On the other hand, the servo control signal is binarized by the digital first-order delta-sigma modulator 21 in this embodiment so that the spectral density 34 of the quantization error component in the high-order resonance mode region 31 of the MEMS can be reduced as in FIG. 3A (the first embodiment). As a result, it is possible to reduce the conversion amount (36) to the low-frequency noise and to suppress the increase of the noise level in the signal band 30.

Figure 8:
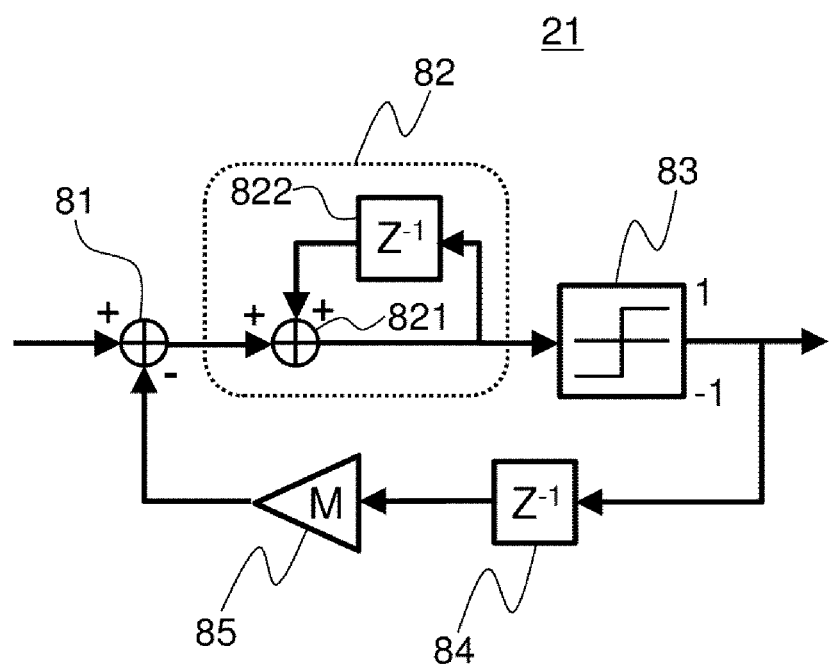
FIG. 8 is a diagram for describing a configuration example of a digital first-order delta-sigma modulator according to the first embodiment.

An example of a configuration and an operation of the digital first-order delta-sigma modulator 21 will be described with reference to FIG. 8. A delay-free integrator 82 is formed with a configuration in which an output of an adder 821 is delayed by one clock period by a one-sample delay device 822, and then, is added again by the adder 821. A signal integrated by the delay-free integrator 82 is input to the one-bit quantizer (encoder) 83, and is binarized to +1 or −1 depending on its sign. An output of the one-bit quantizer (encoder) 83 becomes an output as the digital first-order delta-sigma modulator. In addition, the output of the one-bit quantizer 83 is delayed by one clock period by the one-sample delay device 84, and then, is amplified M times by the digital gain 85. The signal amplified M times is subtracted from the input signal by the subtractor 81 to form a negative feedback control loop. With such negative feedback control, the output of the digital first-order delta-sigma modulator 21 becomes the binary signal of +1 or −1 obtained by pulse-density modulation of the input signal. The binarization is performed by the one-bit quantizer (encoder) 83, and a quantization error occurs at that time. That is, a difference between the input and output values of the one-bit quantizer 83 is the quantization error. Due to functions of the above-described one-time integration by the delay-free integrator 82 and the negative feedback control, the quantization error is suppressed with a slope proportional to a frequency in the high-frequency domain in the output of the digital first-order delta-sigma modulator 21. Thus, the spectral density of the quantization error component in the high-order resonance mode region 31 is reduced as described in FIG. 3A (the first embodiment). Incidentally, an input signal range that the digital first-order delta-sigma modulator can handle becomes approximately ±M due to the M times of the digital gain 85 described in FIG. 8. Thus, the value of M is appropriately set in consideration of an output amplitude range of the PID control unit 16.

Figure 13:
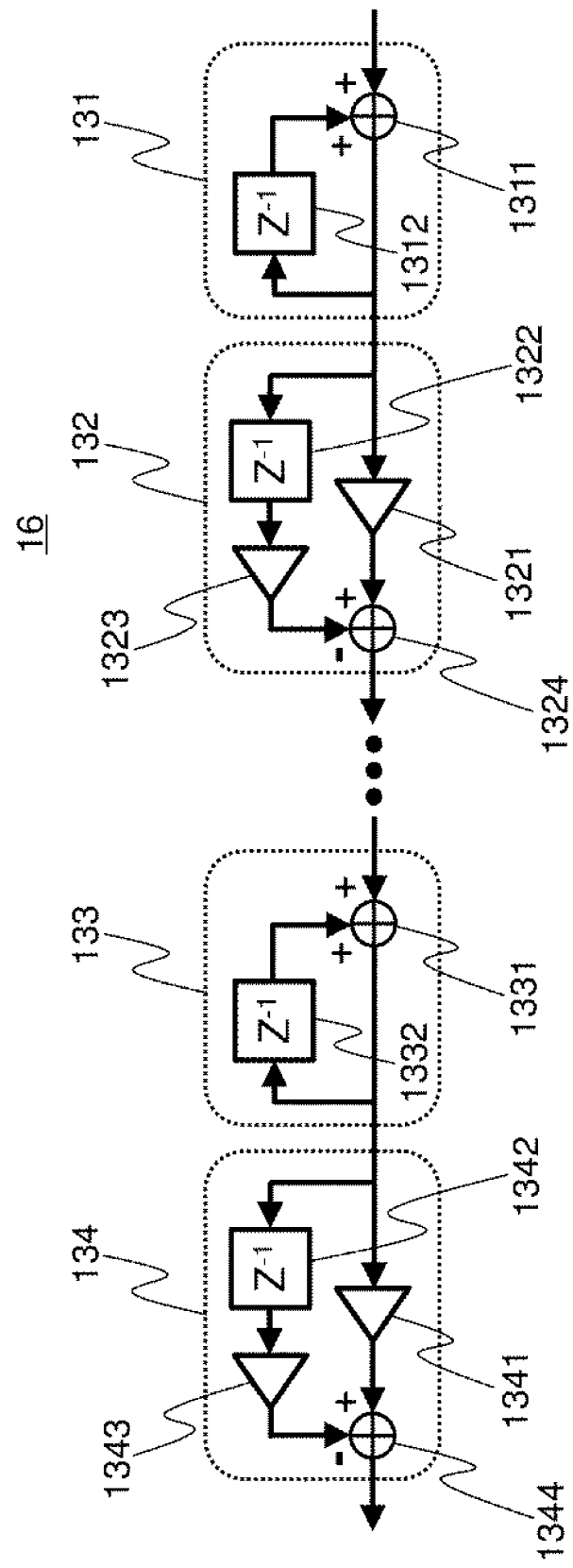
FIG. 13 is a diagram for describing a configuration example of a PID control unit according to each embodiment.

A configuration and an operation of the PID control unit 16 will be described with reference to FIG. 13. A delay-free integrator 131 is formed with a configuration in which an output of an adder 1311 is delayed by one clock period by a one-sample delay device 1312, and then, is added again by the adder 1311. In addition, a zero point generator 132 calculates a difference between a signal obtained by amplifying the input signal by a digital gain 1321 and a signal obtained by delaying the input signal by one clock period by a one-sample delay device 1322 and amplifying the delayed signal by a digital gain 1323 in a subtractor 1324. In the zero point generator 132, a gain of the digital gain 1321 is set to $a*\{1+1/(2\pi*f_z*T)\}$, and a gain of the digital gain 1323 is set to $a/(2\pi*f_z*T)$ in order to realize "a" times of a gain and a zero point frequency $f_z$, that is, in order to realize a transfer function of $a*\{1+s/(2\pi*f_z)\}$ corresponding to a continuous-time expression. Here, T is one clock period.

The delay-free integrators 131 and 133 provide integration operations centered on the PID control unit. In addition, a zero point generator is necessary to stabilize PID control. As illustrated in FIG. 13, n-time integration is performed by connecting the delay-free integrators 131 and 133 in series at n stages, thereby realizing nth-order PID control. In addition, the zero point generators 132 and 134 are also connected in series at a plurality of stages to secure stability of the PID control. Incidentally, the number of stages of the zero point generator may be not necessarily equal to the number of stages of the delay-free integrator.

Second Embodiment

Figure 4:
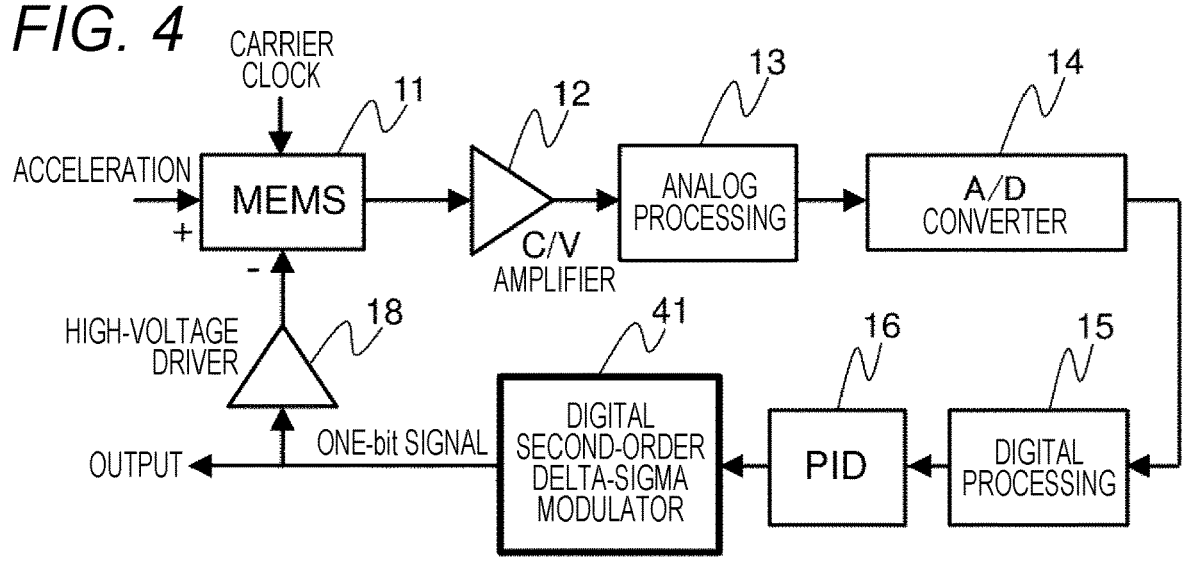
FIG. 4 is a configuration diagram of a MEMS acceleration sensor according to a second embodiment.

A second embodiment will be described with reference to FIG. 4. In the second embodiment, the digital first-order delta-sigma modulator 21 of the first embodiment is replaced by a digital second-order delta-sigma modulator 41, but the other operations are the same as those of the first embodiment.

Figure 5A:
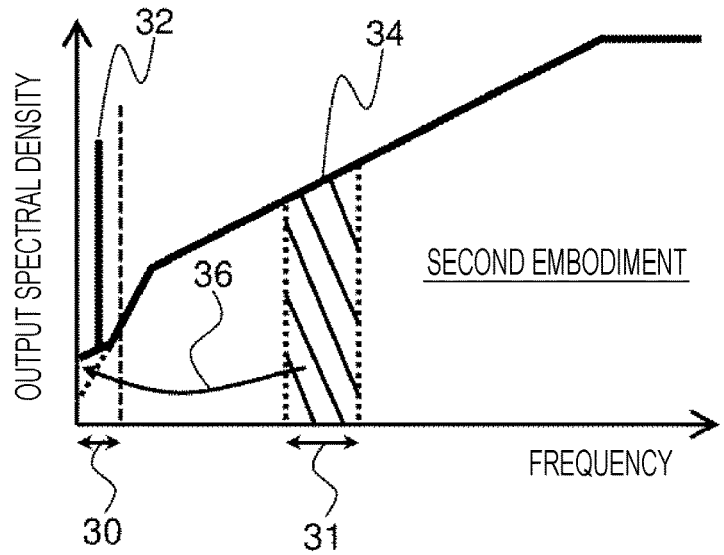
FIG. 5A is a graph for describing an effect of the second embodiment as compared with a conventional example in FIG. 5B.
Figure 5B:
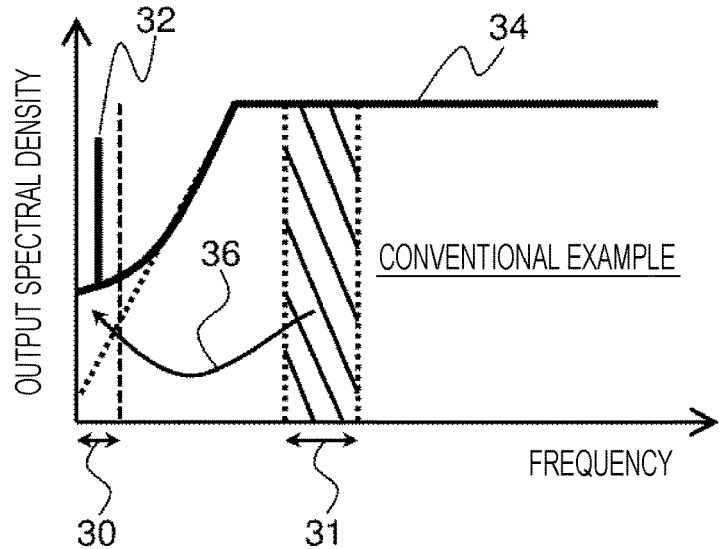

Effects of this embodiment will be described with reference to FIGS. 5A and 5B. In this embodiment, it is possible to further reduce a spectral density 34 of a quantization error component in a high-order resonance mode region 31 as compared with FIG. 3A (the first embodiment) by applying the digital second-order delta-sigma modulator, as illustrated in FIG. 5A (the second embodiment). As a result, it is possible to further reduce the conversion amount (36) to the low-frequency noise and to further suppress the increase of the noise level in the signal band 30.

Figure 9:
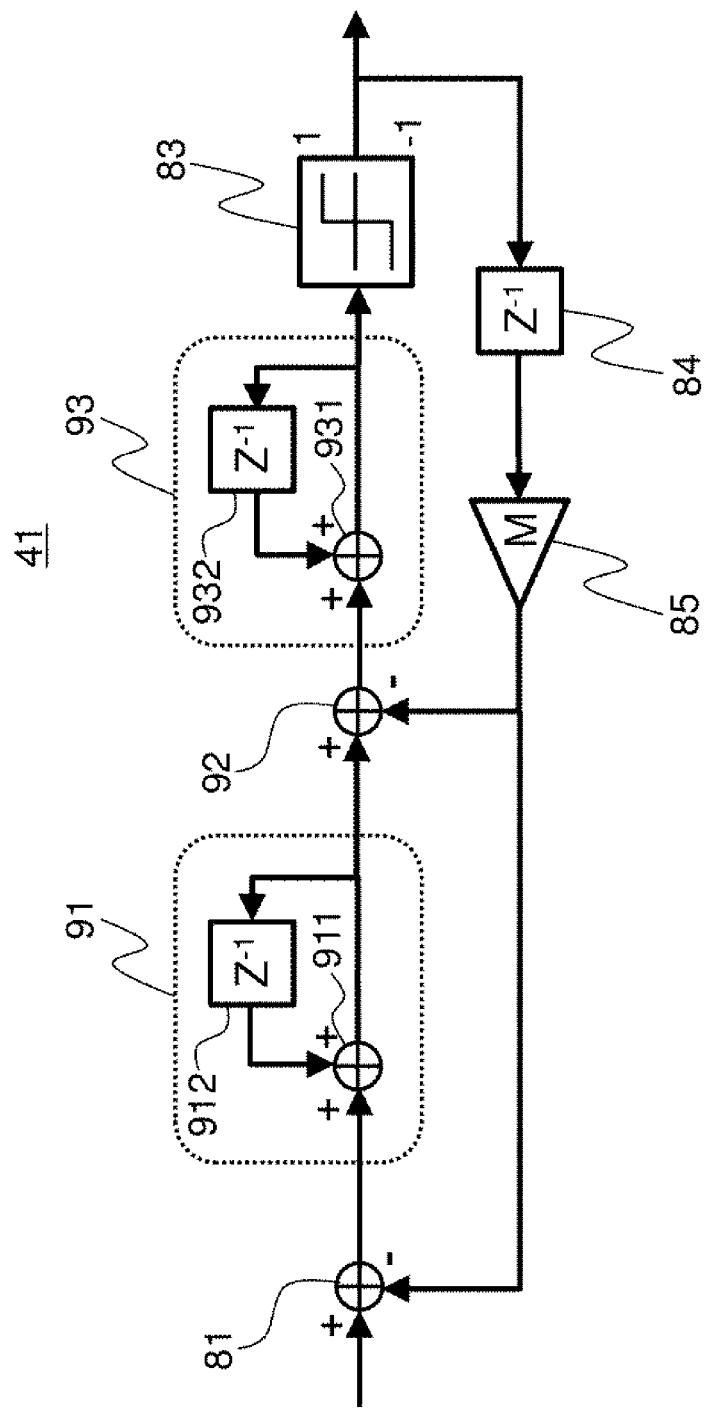
FIG. 9 is a diagram for describing a configuration example of a digital second-order delta-sigma modulator according to the second embodiment.

An example of a configuration and an operation of the digital second-order delta-sigma modulator 41 will be described with reference to FIG. 9. A delay-free integrator 91 is formed with a configuration in which an output of an adder 911 is delayed by one clock period by a one-sample delay device 912, and then, is added again by the adder 911. A second delay-free integrator 93 is formed with a configuration in which an output of an adder 931 is delayed by one clock period by a one-sample delay device 932, and then, is added again by the adder 931. A signal integrated by the delay-free integrator 91 is further passed through a subtractor 92 and subjected to second integration in the delay-free integrator 93. A signal subjected to the second integration is binarized to +1 or −1 depending on its sign by the one-bit quantizer (encoder) 83. An output of the one-bit quantizer (encoder) 83 becomes an output as the digital second-order delta-sigma modulator (binarizer) 41. In addition, the output of the one-bit quantizer 83 is delayed by one clock period by the one-sample delay device 84, and then, is amplified M times by the digital gain 85. The signal amplified M times is subtracted from the input signal by the subtractor 81 to form a negative feedback control loop. In addition, the signal amplified M times is also subtracted from an output of the delay-free integrator 91 by the subtractor 92. With such negative feedback control, the output of the digital second-order delta-sigma modulator (binarizer) 41 becomes the binary signal of +1 or −1 obtained by pulse-density modulation of the input signal. The binarization is performed by the one-bit quantizer 83, and a quantization error occurs at that time. Due to functions of the above-described second-time integration and the negative feedback control, the quantization error is suppressed with a slope proportional to the square of a frequency in the high-frequency domain in the output of the digital second-order delta-sigma modulator 41. Thus, the spectral density of the quantization error component in the high-order resonance mode region 31 is further reduced as compared with FIG. 3A (the first embodiment), as described in FIG. 5A (the second embodiment). Incidentally, an input signal range that the digital second-order delta-sigma modulator 41 can handle becomes approximately ±M due to the digital gain 85 of M times described in FIG. 9. Thus, the value of M is appropriately set in consideration of an output amplitude range of the PID control unit 16.

Figure 10:
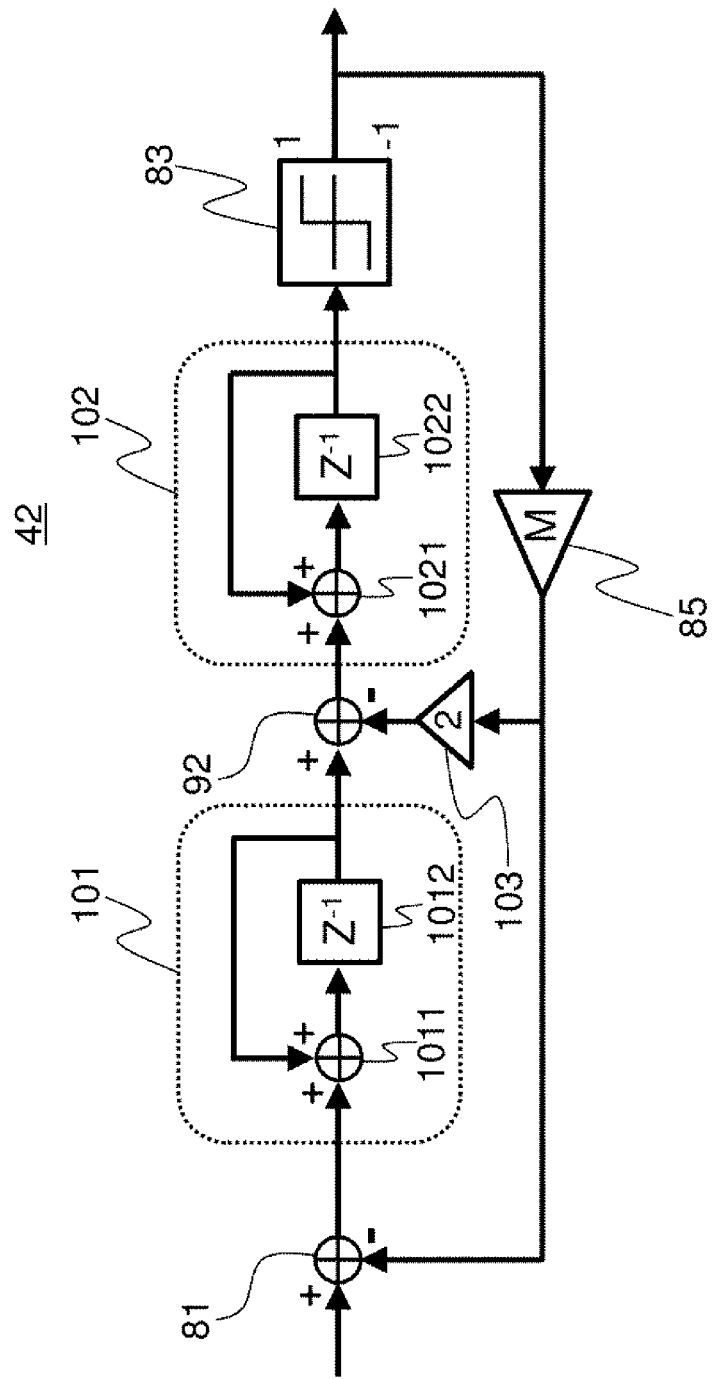
FIG. 10 is a diagram for describing a configuration example different from that of FIG. 9 of the digital second-order delta-sigma modulator according to the second embodiment.

FIG. 10 illustrates another example of a digital second-order delta-sigma modulator 42. Two delay-applying integrators 101 and 102 are applied. These integrators have the same constituent elements and operations as the delay-free integrators 91 and 93 illustrated in FIG. 9, but a delay corresponding to one clock period is performed simultaneously with the integration since one-sample delay devices 1012 and 1022 are inserted in a signal path. In addition, an output of the digital gain 85 is doubled by a digital gain 103, and then, subtracted in the subtractor 92. The one-sample delay device 84 of FIG. 9 is unnecessary. With such configuration changes, it is possible to obtain an output similar to that of the digital second-order delta-sigma modulator 41 in FIG. 9.

Figure 11:
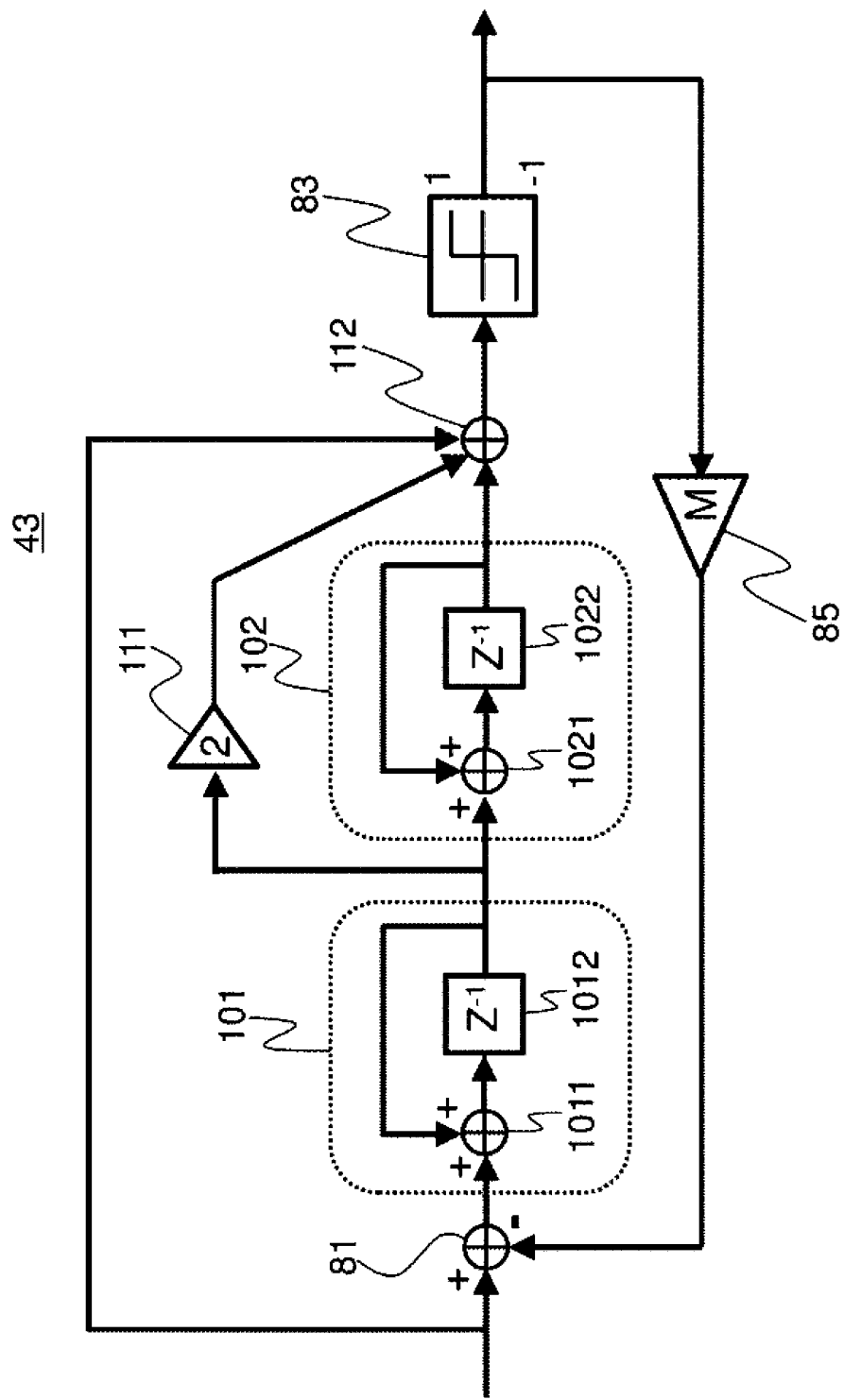
FIG. 11 is a diagram for describing a configuration example different from those of FIGS. 9 and 10 of the digital second-order delta-sigma modulator according to the second embodiment.

FIG. 11 illustrates still another example of a digital second-order delta-sigma modulator 43. This is a configuration called a feed forward type. Similarly to FIG. 10, the two delay-applying integrators 101 and 102 are applied. The subtractor 92 in FIGS. 9 and 10 is unnecessary, and the one-sample delay device 84 in FIG. 9 is also unnecessary. Instead, an adder 112 is inserted between the delay-applying integrator 102 and the one-bit quantizer 83. The adder 112 adds an input signal, a signal obtained by amplifying an output signal of the delay-applying integrator 101 twice by a digital gain 111, and an output of the delay-applying integrator 102. With this configuration, it is possible to obtain an output similar to that of the digital second-order delta-sigma modulator 41 in FIG. 9.

Third Embodiment

Figure 6:
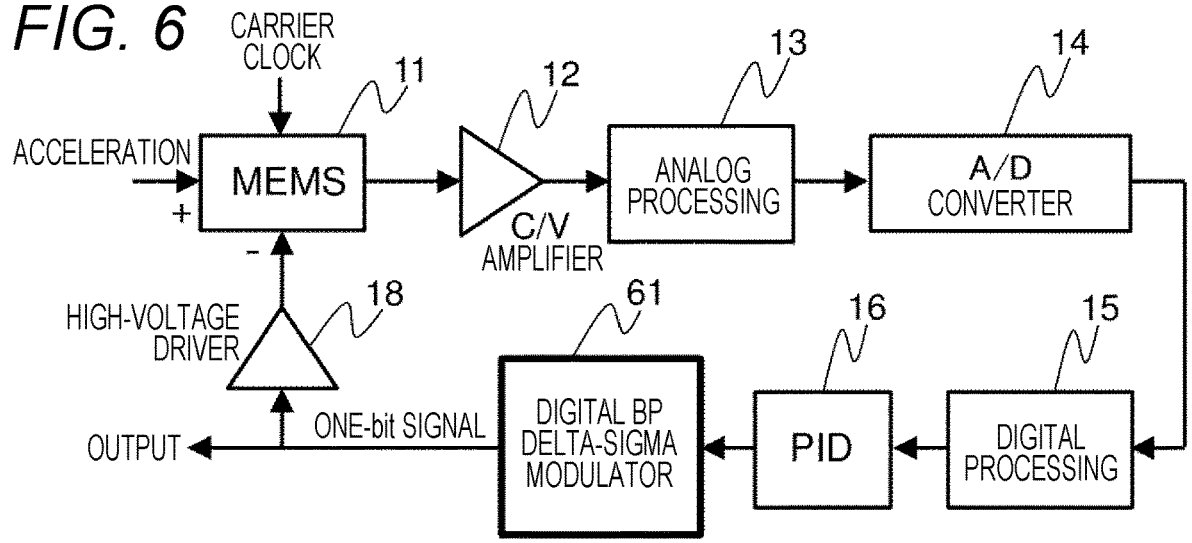
FIG. 6 is a configuration diagram of a MEMS acceleration sensor according to a third embodiment.

A third embodiment will be described with reference to FIG. 6. In the third embodiment, the digital first-order delta-sigma modulator 21 of the first embodiment is replaced by a digital band-pass (BP) delta-sigma modulator 61, but the other operations are the same as those of the first embodiment.

Figure 7A:
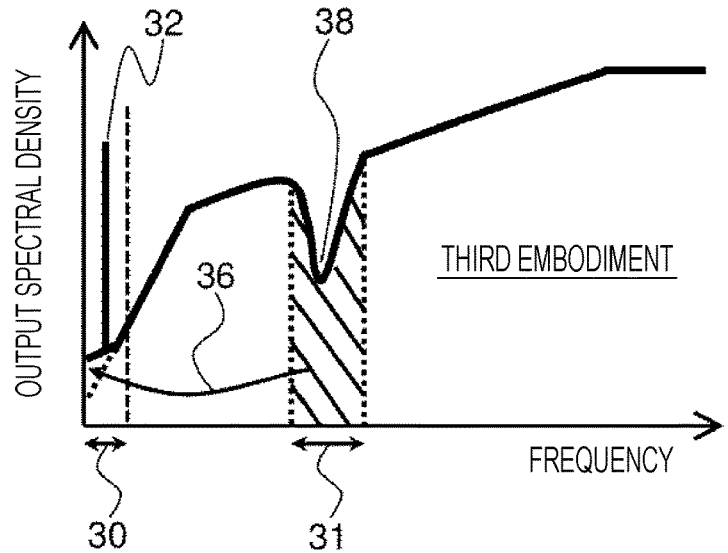
FIG. 7A is a graph for describing an effect of the third embodiment as compared with a conventional example in FIG. 7B.
Figure 7B:
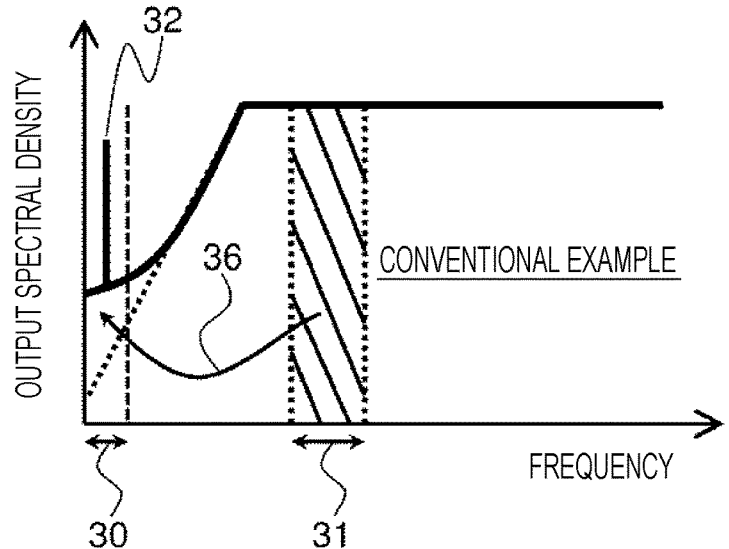

Effects of this embodiment will be described with reference to FIGS. 7A and 7B. In this embodiment, a spectral density of a quantization error component in the high-order resonance mode region 31 can be selectively reduced (38) as in FIG. 7A (the third embodiment) by applying the digital BP delta-sigma modulator 61. As a result, it is possible to reduce the conversion amount (36) to a low-frequency noise and to further suppress an increase of a noise level in the signal band 30 as compared with the case of FIG. 3A (the first embodiment).

Figure 12:
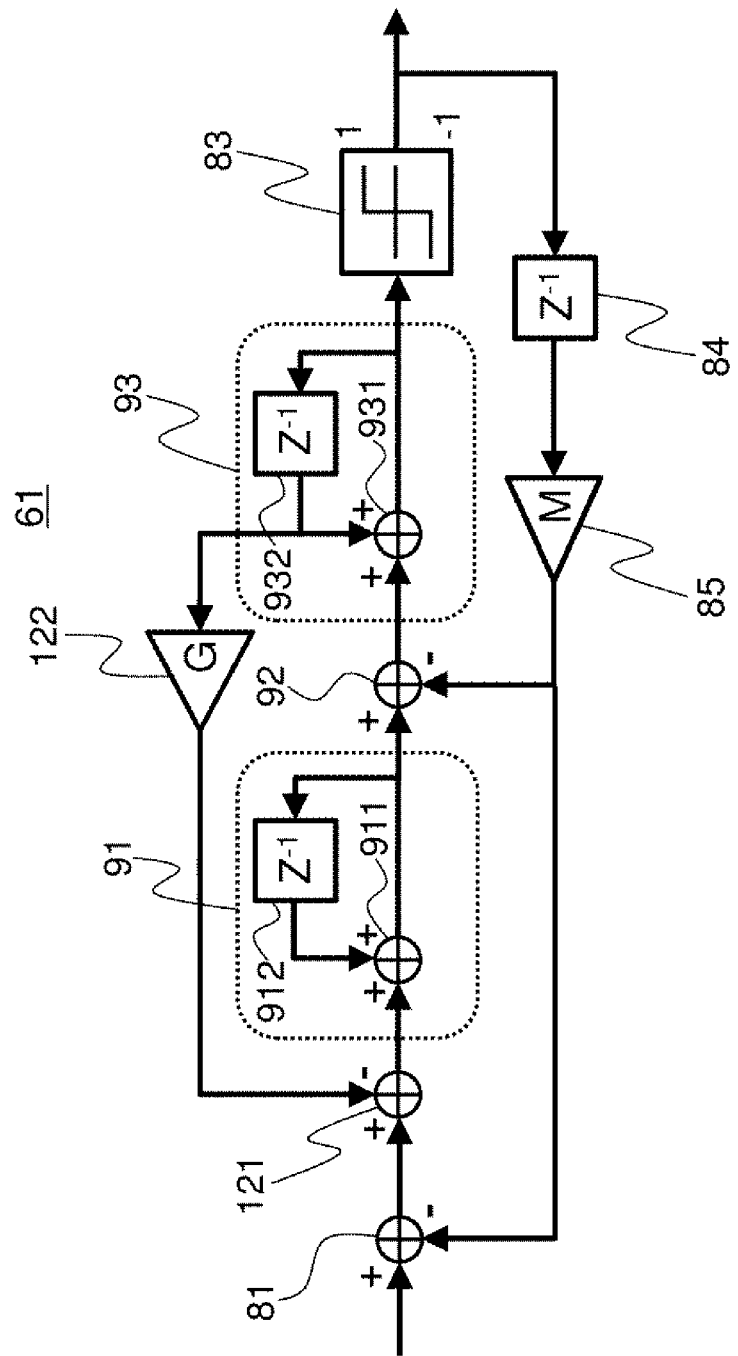
FIG. 12 is a diagram for describing a configuration example of a digital BP delta-sigma modulator according to the third embodiment.

An example of a configuration and an operation of the digital BP delta-sigma modulator 61 will be described with reference to FIG. 12. This configuration is a configuration obtained by adding a digital gain 122 of G times and local negative feedback using a subtractor 121 to the configuration of the digital second-order delta-sigma modulator 41 of FIG. 9.

A first delay-free integrator 91 is formed with the configuration in which an output of the adder 911 is delayed by one clock period by the one-sample delay device 912, and then, is added again by the adder 911. A second delay-free integrator 93 is formed with a configuration in which an output of an adder 931 is delayed by one clock period by a one-sample delay device 932, and then, is added again by the adder 931. A signal integrated by the delay-free integrator 91 is further passed through a subtractor 92 and subjected to second integration in the delay-free integrator 93. On the other hand, a signal obtained by delaying an output signal of the one-sample delay device 932, that is, an output of the delay-free integrator 93 by one clock period is amplified G times by the digital gain 122, and subtracted in the subtractor 121 positioned at the front of the delay-free integrator 91. As a result, a local feedback control loop is formed. In addition, an output of the delay-free integrator 93 is binarized to +1 or −1 depending on its sign by the one-bit quantizer (encoder) 83. An output of the one-bit quantizer (encoder) 83 becomes an output as the digital BP delta-sigma modulator (binarizer) 61. Further, the output of the one-bit quantizer 83 is delayed by one clock period by the one-sample delay device 84, and then, is amplified M times by the digital gain 85. The signal amplified M times is subtracted from the input signal by the subtractor 81 to form a negative feedback control loop. In addition, the signal amplified M times is also subtracted from an output of the delay-free integrator 91 by the subtractor 92. With such negative feedback control, the output of the digital BP delta-sigma modulator (binarizer) 61 becomes the binary signal of +1 or −1 obtained by pulse-density modulation of the input signal. The binarization is performed by the one-bit quantizer (encoder) 83, and a quantization error occurs at that time. Due to functions of the two times of integration, the local feedback control, and the negative feedback control, the quantization error is suppressed, at the output of the digital BP delta-sigma modulator 61, with a slope proportional to a frequency in a high-frequency domain, and additionally, is selectively suppressed abruptly at a frequency position 38 corresponding to the digital gain 122 of G times. Thus, the spectral density of the quantization error component in the high-order resonance mode region 31 can be selectively reduced as described in FIG. 7A (the third embodiment) by setting the value of G such that the frequency position 38 becomes near the center of the high-order resonance mode region 31. Incidentally, an input signal range that the digital BP delta-sigma modulator 61 can handle becomes approximately ±M due to the digital gain 85 of M times described in FIG. 12. Thus, the value of M is appropriately set in consideration of an output amplitude range of the PID control unit 16.

Fourth Embodiment

Figure 14:
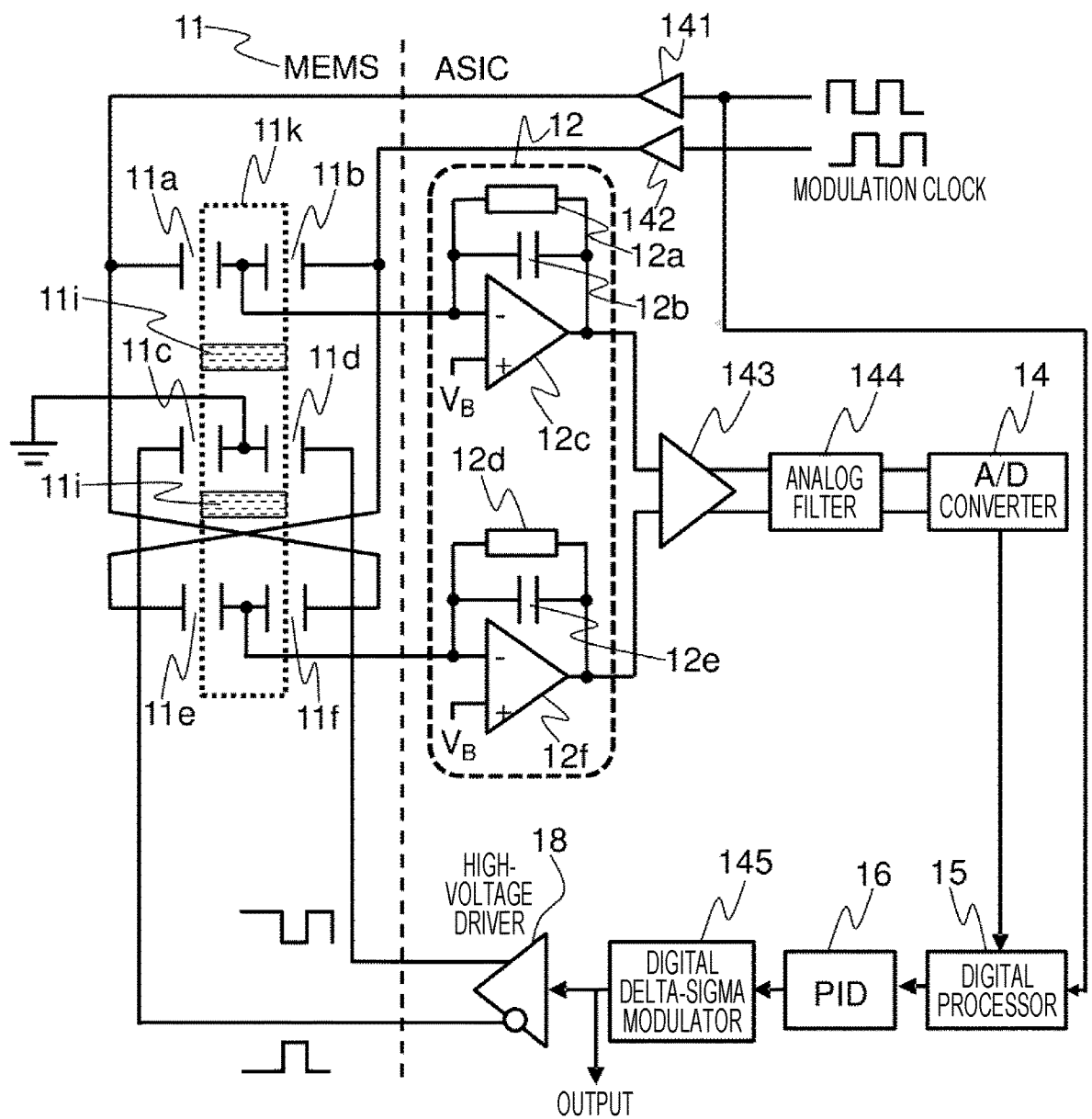
FIG. 14 is a diagram for describing a fourth embodiment in which configuration examples of MEMS and a C/V amplifier according to the first to third embodiments are detailed.

A fourth embodiment will be described with reference to FIG. 14. This embodiment discloses the configurations of the MEMS 11 and the C/V amplifier 12 according to the first to third embodiments in detail.

In a MEMS acceleration sensor, the capacitive MEMS 11, the C/V amplifier 12, an amplifier 143, an analog filter 144, the A/D converter 14, the digital signal processing unit 15, the PID control unit 16, and a digital delta-sigma modulator (binarizer) 145 are connected in this order. An output of the digital delta-sigma modulator (binarizer) 145 becomes an output as the acceleration sensor, and thereafter, a digital filter is appropriately inserted so that a component outside a signal band is suppressed. In addition, the output of the digital delta-sigma modulator 145 is connected to a high-voltage driver 18, and a differential output voltage of the high-voltage driver 18 is applied to a pair of servo capacitors 11c and 11d in the MEMS 11, thereby forming a negative feedback servo control loop.

As the MEMS 11 receives a differential force between an inertial force caused by an externally-applied acceleration signal and a servo force caused by an electrostatic force generated by the differential output voltage of the high-voltage driver 18, a movable electrode 11k moves, and accordingly, capacitance values of a pair of detection capacitors 11a and 11b and a pair of detection capacitors 11e and 11f change. Differential carrier clock (modulation clock) signals are applied in opposite phases to the pair of detection capacitors 11a and 11b and the pair of detection capacitors 11e and 11f via clock buffers 141 and 142, respectively. As a result, the change of the capacitance value is converted into a change of a charge and is amplitude-modulated, and is supplied to the C/V amplifier 12 as a differential charge signal.

Incidentally, potentials of movable electrodes of the pair of detection capacitors 11a and 11b and the pair of detection capacitors 11e and 11f are set to a fixed potential ($V_B$) by virtual grounding characteristics of operational amplifiers 12c and 12f in the C/V amplifier 12, respectively. On the other hand, a movable electrode of the pair of servo capacitors 11c and 11d is fixed to a ground potential. These movable electrodes of the pair of detection capacitors and the pair of servo capacitors are mechanically coupled so as to move integrally. However, an insulating layer 11i is provided between both the movable electrodes to electrically insulate the movable electrodes from each other such that the potential of the movable electrode of the pair of detection capacitors is kept at the fixed potential ($V_B$) and the movable electrode of the pair of servo capacitors is kept at the ground potential. As a result, it is possible to prevent unnecessary components caused by the differential output voltage of the high-voltage driver 18 from being superimposed on the differential charge signal. Incidentally, the movable electrode of the pair of servo capacitors 11c and 11d may be connected to a DC potential other than the ground potential.

The C/V amplifier 12 has a pseudo differential circuit configuration in which two operational amplifier feedback circuits, each of which is configured of an operational amplifier, a feedback capacitor, and a feedback resistor, are used in parallel, and converts the differential charge signal into a voltage signal. Since a conversion gain at that time is inversely proportional to capacitance values of feedback capacitors 12b and 12e, these capacitance values are appropriately set. In addition, feedback resistors 12a and 12d are used to perform direct feedback, and a high resistance value is applied. Incidentally, the C/V amplifier of this embodiment has the pseudo-differential circuit configuration that uses the two operational amplifiers 12c and 12f as described above, but may have a fully differential circuit configuration that uses one fully differential operational amplifier. The amplifier 143 is a differential amplifier and amplifies the voltage signal output from the C/V amplifier 12. In addition, the analog filter 144 has a differential circuit configuration and removes unnecessary components and noise. The A/D converter 14 has a differential circuit configuration and converts an analog voltage signal into a digital value. As described above, these analog circuits have the differential circuit configuration excellent in noise tolerance, but it is also possible to apply a single-end circuit configuration. The digital signal processing unit 15 performs demodulation using the carrier clock signal, removal of unnecessary components, and the like. The PID control unit 16 performs PID control including calculation of integration and subtraction by the configuration described with reference to FIG. 13 to calculate the servo control signal. The digital delta-sigma modulator (binarizer) 145 modulates a pulse density of the servo control signal to be output as a binary value of +1 or −1. It is possible to apply any of the digital first-order delta-sigma modulator, the digital second-order delta-sigma modulator, and the digital BP delta-sigma modulator described in the first to third embodiments, and the effects thereof are obtained as described above. As described above, these modulators can be realized with the configurations of FIG. 8 to FIG. 12, for example. The high-voltage driver 18 is the differential output, converts the signals of +1 and −1 output from the digital delta-sigma modulator 145 into VSV (VSV is a high potential of about 10 V to 20 V) and the ground potential, respectively, and outputs the converted voltages from a positive-phase output. In addition, the signals of +1 and −1 are converted to the ground potential and VSV, respectively, and output from a negative-phase output. As described above, these differential outputs are applied to the pair of servo capacitors 11c and 11d in the MEMS 11, thereby forming the negative feedback servo control loop. With the negative feedback servo control loop, the inertial force caused by the input acceleration signal and the servo force are controlled to be balanced in a steady state. Thus, the output of the digital delta-sigma modulator 145, which is a source that generates the servo force, can be used as a sensor output.

Incidentally, various configurations other than the configuration disclosed in this embodiment can be adopted as the configuration of the MEMS, each analog circuit, and the digital unit. For example, a plurality of pairs of servo capacitors may be formed in the configuration of FIG. 14.

Fifth Embodiment

Figure 15:
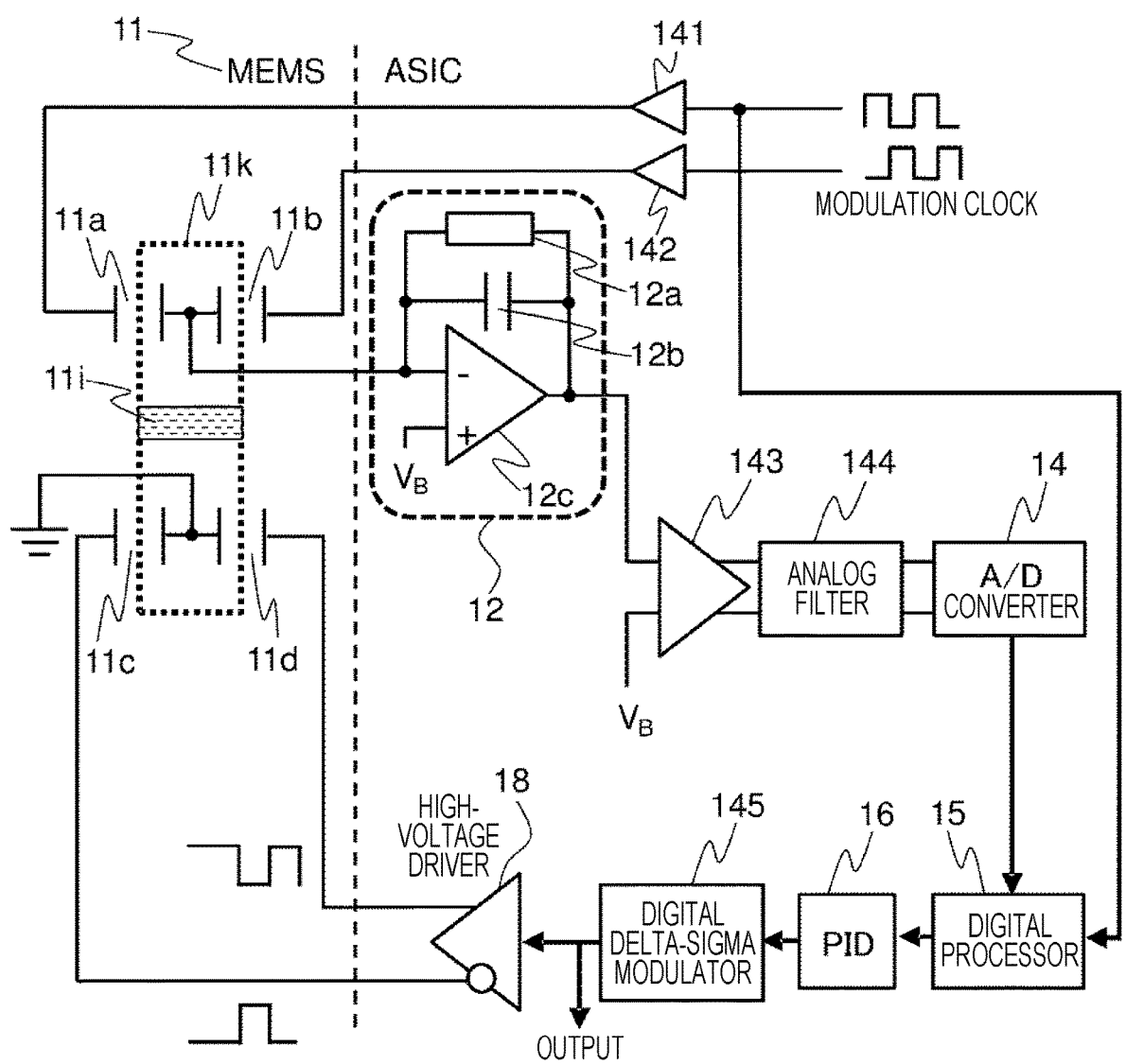
FIG. 15 is a diagram for describing a fifth embodiment in which the configuration of the MEMS according to the fourth embodiment is changed.

A fifth embodiment will be described with reference to FIG. 15. A difference from the fourth embodiment is that only one pair of detection capacitors and only one pair of servo capacitors are provided in the MEMS 11. As a result, the MEMS is simplified and downsized. Correspondingly, the C/V amplifier 12 has a single-ended circuit configuration. Although the differential circuit configuration of the fourth embodiment has superior noise tolerance, the fifth embodiment enables further miniaturization.

What is claimed is:
1. A MEMS capacitive acceleration sensor comprising:
a capacitive MEMS; a C/V amplifier; an analog/digital converter; a digital PID control unit; and a binarizer,
wherein the C/V amplifier converts a charge signal output from the capacitive MEMS into an electric signal, the analog/digital converter converts an analog signal based on the electric signal into a digital signal, the digital PID control unit calculates a control signal based on the digital signal, the binarizer converts the control signal into a binary signal, a negative feedback servo control loop in which the capacitive MEMS is controlled by the binary signal is formed,
the digital PID control unit performs integration at least once to calculate the control signal,
the binarizer forms a feedback loop comprising an integrator, a subtractor, and an encoder, and
the encoder generates a binary output depending on whether an input signal is a positive value or a negative value.
2. The MEMS capacitive acceleration sensor according to claim 1, wherein
the binarizer comprises two integrators in series.
3. The MEMS capacitive acceleration sensor according to claim 2, wherein
the capacitive MEMS includes a pair of detection capacitors and a pair of servo capacitors,
a movable electrode of the pair of detection capacitors is connected to an input of the C/V amplifier,
a movable electrode of the pair of servo capacitors is connected to a DC potential,
the movable electrode of the pair of detection capacitors and the movable electrode of the pair of servo capacitors are electrically insulated from each other,
a fixed electrode of the pair of detection capacitors is connected to a clock signal voltage, and
a fixed electrode of the pair of servo capacitors is connected to a voltage signal based on the binary signal.
4. The MEMS capacitive acceleration sensor according to claim 3, wherein
the DC potential is a ground potential.
5. The MEMS capacitive acceleration sensor according to claim 1, wherein
the binarizer comprises: two integrators arranged in series; and a local loop in which an output signal of the integrator at a latter stage is fed back to front of the integrator at a preceding stage.
6. The MEMS capacitive acceleration sensor according to claim 5, wherein
the capacitive MEMS includes a pair of detection capacitors and a pair of servo capacitors,
a movable electrode of the pair of detection capacitors is connected to an input of the C/V amplifier,
a movable electrode of the pair of servo capacitors is connected to a DC potential,
the movable electrode of the pair of detection capacitors and the movable electrode of the pair of servo capacitors are electrically insulated from each other,
a fixed electrode of the pair of detection capacitors is connected to a clock signal voltage, and
a fixed electrode of the pair of servo capacitors is connected to a voltage signal based on the binary signal.
7. The MEMS capacitive acceleration sensor according to claim 6, wherein
the DC potential is a ground potential.

8. The MEMS capacitive acceleration sensor according to claim 1, wherein
- the capacitive MEMS includes a pair of detection capacitors and a pair of servo capacitors,
- a movable electrode of the pair of detection capacitors is connected to an input of the C/V amplifier,
- a movable electrode of the pair of servo capacitors is connected to a DC potential,
- the movable electrode of the pair of detection capacitors and the movable electrode of the pair of servo capacitors are electrically insulated from each other,
- a fixed electrode of the pair of detection capacitors is connected to a clock signal voltage, and
- a fixed electrode of the pair of servo capacitors is connected to a voltage signal based on the binary signal.

9. The MEMS capacitive acceleration sensor according to claim 8, wherein
- the DC potential is a ground potential.

\* \* \* \* \*